(12) United States Patent
Osenkowski

(10) Patent No.: US 7,861,902 B2
(45) Date of Patent: Jan. 4, 2011

(54) SPARE TIRE STOWAGE APPARATUS

(75) Inventor: Leslie Osenkowski, Northville Township, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 1036 days.

(21) Appl. No.: 11/205,626

(22) Filed: Aug. 17, 2005

(65) Prior Publication Data

US 2007/0039987 A1    Feb. 22, 2007

(51) Int. Cl.
*B62D 43/02* (2006.01)

(52) U.S. Cl. .................. 224/42.21; 224/42.24; 224/504; 224/518

(58) Field of Classification Search ............. 224/42.13, 224/42.21, 42.24, 504, 518, 42.12, 42.28, 224/495, 502, 507; 414/463, 465, 466
See application file for complete search history.

(56) References Cited

U.S. PATENT DOCUMENTS

| | | | | |
|---|---|---|---|---|
| 3,387,754 A | * | 6/1968 | Sinkey et al. ............. | 224/42.21 |
| 3,845,891 A | * | 11/1974 | Becher ..................... | 224/42.21 |
| 4,410,117 A | * | 10/1983 | Crawford et al. ............ | 224/490 |
| 4,418,851 A | * | 12/1983 | Ankeny ..................... | 224/504 |
| 4,915,274 A | * | 4/1990 | Oliver ..................... | 224/42.24 |
| 5,104,015 A | * | 4/1992 | Johnson ..................... | 224/401 |
| 5,957,346 A | * | 9/1999 | Schambre et al. ......... | 224/42.21 |
| 6,659,318 B2 | * | 12/2003 | Newbill ..................... | 224/503 |
| 6,701,913 B1 | * | 3/2004 | LeDuc et al. ............... | 126/276 |

* cited by examiner

*Primary Examiner*—Justin M Larson
(74) *Attorney, Agent, or Firm*—Ralph E. Smith

(57) ABSTRACT

A spare tire and wheel assembly is stowed on a rear tail gate of a motor vehicle by a carrier. The carrier is pivoted to rigid vehicle frame structure beneath the rear tail gate for vertical swinging movement about a transverse horizontal axis from a generally upright stowage position downwardly to a rearwardly extending, lower position. A latch mechanism releasably latches the carrier to the tail gate in the stowage position. The tire and wheel assembly is releasably mounted on the carrier.

9 Claims, 3 Drawing Sheets

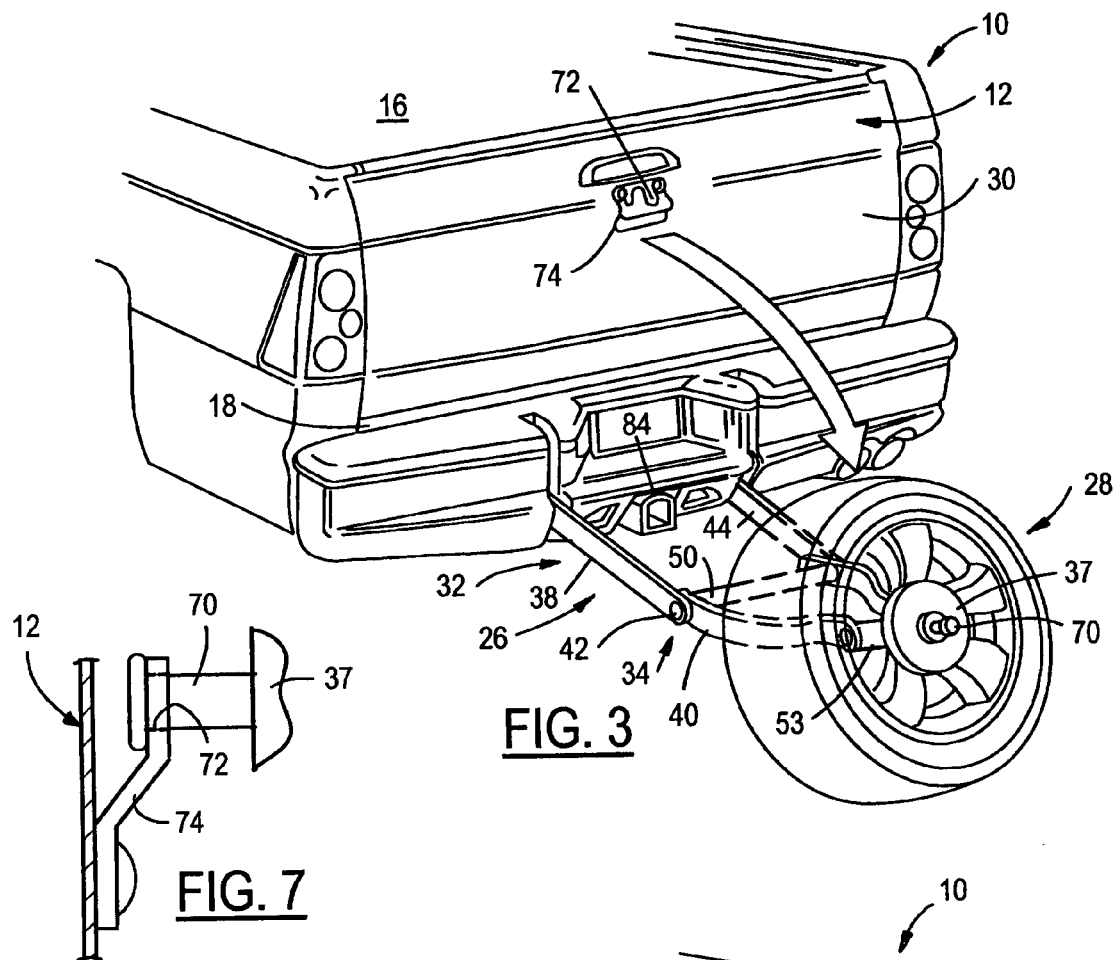
FIG. 3
FIG. 7
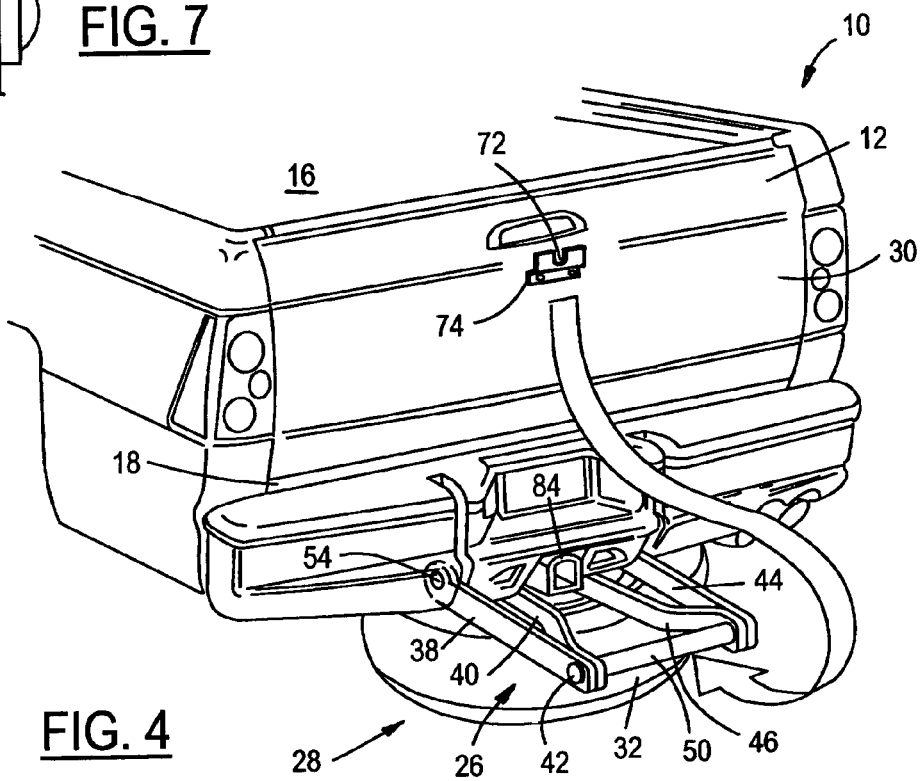
FIG. 4

SPARE TIRE STOWAGE APPARATUS

FIELD OF THE INVENTION

This invention relates generally to a spare tire stowage apparatus and more particularly to apparatus for stowing a tire and wheel assembly on the tail gate of a motor vehicle.

BACKGROUND OF THE INVENTION

Spare tires and/or spare tire and wheel assemblies can be mounted on the underside or inside of the vehicle or on the tail gate. This is done both for convenience and also for the sake of appearance. Specific to a tail gate mounting, a tire and wheel assembly is very heavy and has to be removed before opening the tail gate. Then, putting the tire and wheel assembly back on the tail gate is difficult for most people. Various approaches to the problem have not been particularly successful. It is possible to mount the tire and wheel assembly so that it can be swung to one side about a vertical axis, but this approach has certain drawbacks. For example, the weight of a post for establishing a vertical pivot axis can interfere with the normal opening of the tail gate.

SUMMARY OF THE INVENTION

In accordance with the present invention, apparatus is provided for stowing a spare tire and wheel assembly on a rear tail gate of a motor vehicle which comprises a carrier pivoted to rigid vehicle frame structure beneath the tail gate for vertical swinging movement about a transverse horizontal axis toward and away from a generally upright stowage position. A latch mechanism is provided for releasably latching the carrier to the tail gate in the stowage position. A mount on a swinging end of the carrier is provided for releasably mounting the spare tire and wheel assembly.

More particularly, and in accordance with the present disclosure, the carrier comprises laterally spaced apart arms which are pivoted to the rigid frame structure by aligned pivot pins. The mount is attached to the outer ends of the arms.

Further in accordance with the embodiment described hereinafter, each of the arms has inner and outer arm segments which are pivoted together. This enables the arm segments to be doubled back and folded with respect to one another so that when the carrier is detached from the tail gate, the tail gate can be swung down to a cargo loading position and the carrier will be underneath the tail gate.

Preferably, a power drive is provided for swinging the carrier toward and away from its stowage position. Activation of this device can be done electronically from both inside the vehicle or from the key fob.

A trailer hitch may be mounted on the same rigid frame structure to which the carrier is attached, for convenience in towing another wheeled vehicle.

One object of this invention is to provide apparatus for stowing a spare tire and wheel assembly on a rear tail gate of a motor vehicle having the foregoing features and capabilities.

Other objects, features and advantages of the invention will become apparent as the following description proceeds.

Further areas of applicability of the present invention will become apparent from the detailed description provided hereinafter. It should be understood that the detailed description and specific examples, while indicating preferred embodiments of the invention, are intended for purposes of illustration only and are not intended to limit the scope of the invention.

BRIEF DESCRIPTION OF THE DRAWINGS

The present invention will become more fully understood from the detailed description and accompanying drawings, wherein:

FIG. 3 is a view similar to FIGS. 1 and 2 but shows the carrier detached from the tail gate and swung to a lower position;

FIG. 4 is a view similar to FIG. 3 but shows the carrier in a folded condition;

FIG. 7 is a fragmentary view of a latch for securing the carrier to the tail gate.

DETAILED DESCRIPTION OF THE PREFERRED EMBODIMENT

Figure 1:
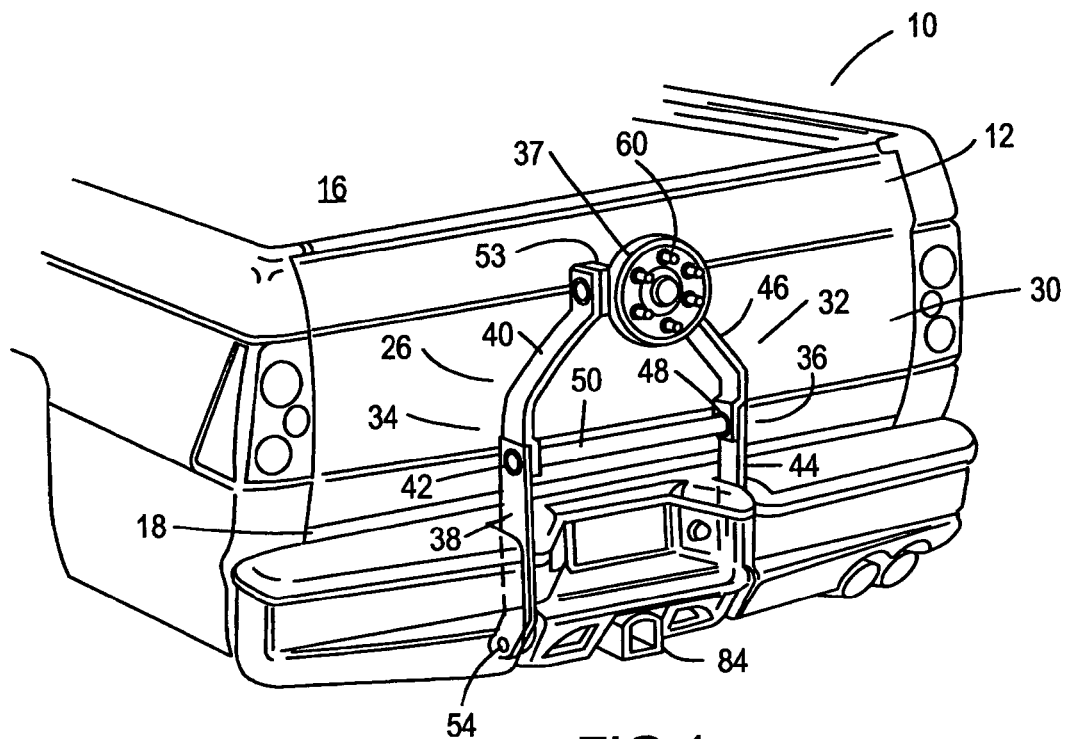
FIG. 1 is a perspective view showing apparatus for stowing a spare tire and wheel assembly on a rear tail gate of a motor vehicle, constructed in accordance with the present invention.

The following description of the preferred embodiment is merely exemplary in nature and is in no way intended to limit the invention, its application, or uses.

Referring now more particularly to the drawings, there is shown an automotive vehicle 10 having a rear tail gate 12 for closing a rear opening 14 to a cargo area 16. The tail gate 12 has a lower edge portion hinged to the rear of the vehicle on a transverse horizontal axis 18 for swinging movement from a generally vertical, closed position shown in FIGS. 1-4 downwardly to a substantially horizontal open position shown in FIG. 5. The tail gate is supported in the open position by cables 20 each having a connector 22 at one end pivoted to the vehicle body and a connector 24 at the other end pivoted to the tail gate.

Figure 5:
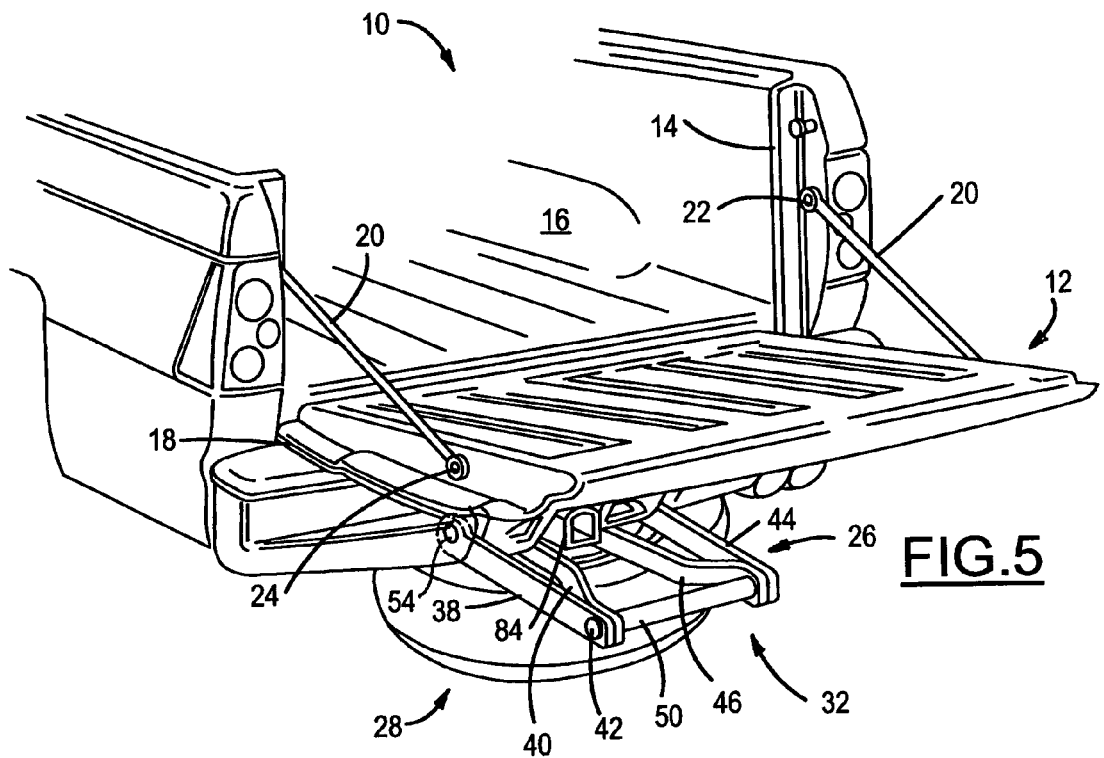
FIG. 5 is a view similar to FIG. 4 but shows the tail gate swung to the open position over the folded carrier.

Apparatus 26 is provided to stow a spare tire and wheel assembly 28 on the outer wall 30 of the tail gate. The apparatus 26 comprises a carrier 32 having a pair of laterally spaced apart arms 34 and 36 and a mount 37 for the tire and wheel assembly. The arm 34 has an inner arm segment 38 and an outer arm segment 40, the adjacent ends of which are pivoted together by a pivot pin 42. The arm 36 has an inner arm segment 44 and an outer arm segment 46, the adjacent ends of which are pivoted together by a pivot pin 48. The pivot pins 42 and 48 are aligned on a transverse horizontal axis 49 and connected by a cross rod 50. As seen in FIGS. 4 and 5, the outer arm segments 40 and 46 can be doubled back to a folded condition in which the inner and outer arm segments of each arm are substantially parallel to one another. The outer arm segments 40 and 46 cannot be folded in the opposite direction relative to the inner arm segments 38 and 44 because of the tabs 51 (FIG. 6) on the outer arm segments which are engageable with the inner arm segments.

Figure 2:
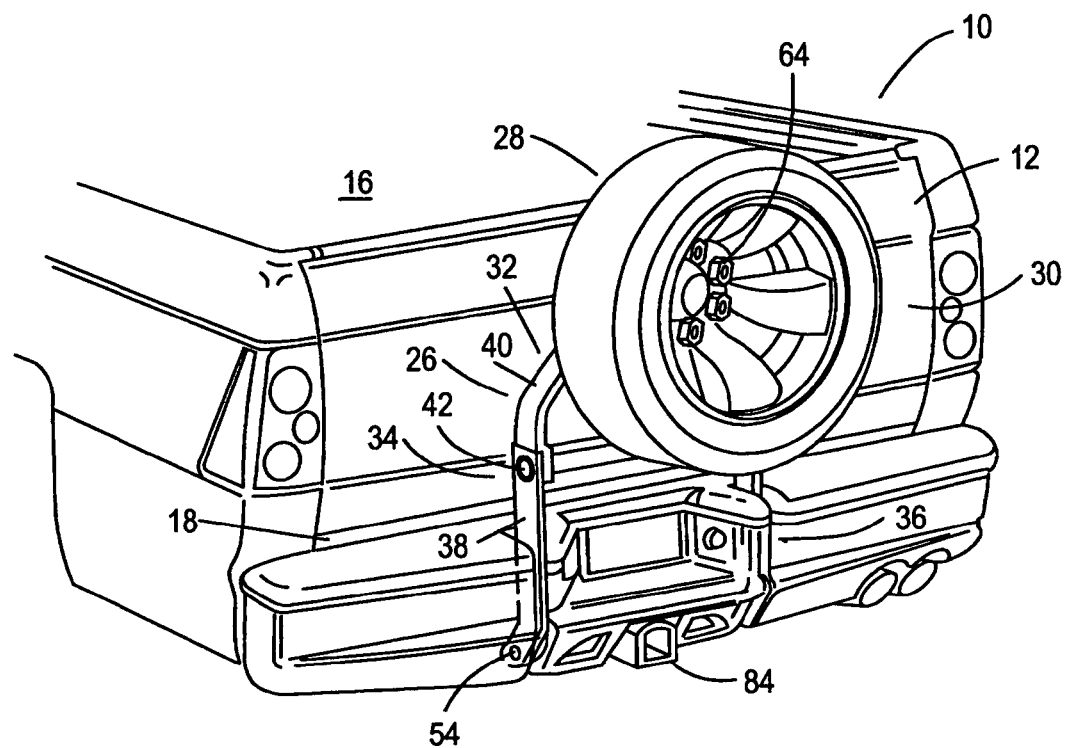
FIG. 2 is a view similar to FIG. 1 but shows a tire and wheel assembly mounted on the carrier.

The inner ends of the inner arm segments 38 and 44 are pivoted to a rigid vehicle frame structure in the form of a bar 52 by transversely aligned pivot pins 54 and 56 for vertical swinging movement about the axis 58 established by the pivot pins from the generally upright stowage position shown in FIGS. 1 and 2 downwardly to a rearwardly extending lower position shown in FIG. 3.

The mount 37 is pivoted to the outer ends of the outer arm segments 40 and 46 of the arms 34 and 36 by a bracket 53. The mount 37 has studs 60 to be received in holes in the wheel of the tire and wheel assembly 28, to which nuts 64 can be applied to releasably secure the tire and wheel assembly 28 to the mount.

The axis 18 of swinging movement of the tail gate 12, the axis 58 of swinging movement of the carrier 32, and the axis 49 of the pivot pins 42 and 48 connecting the arm segments of each of the arms 34 and 36 are spaced apart and parallel.

The carrier 32 is latched in the upright stowage position of FIGS. 1 and 2 by a headed latch pin 70 on the mount 37 releasably engageable in a slot 72 of a latch bracket 74 secured to the tail gate 12.

Figure 6:
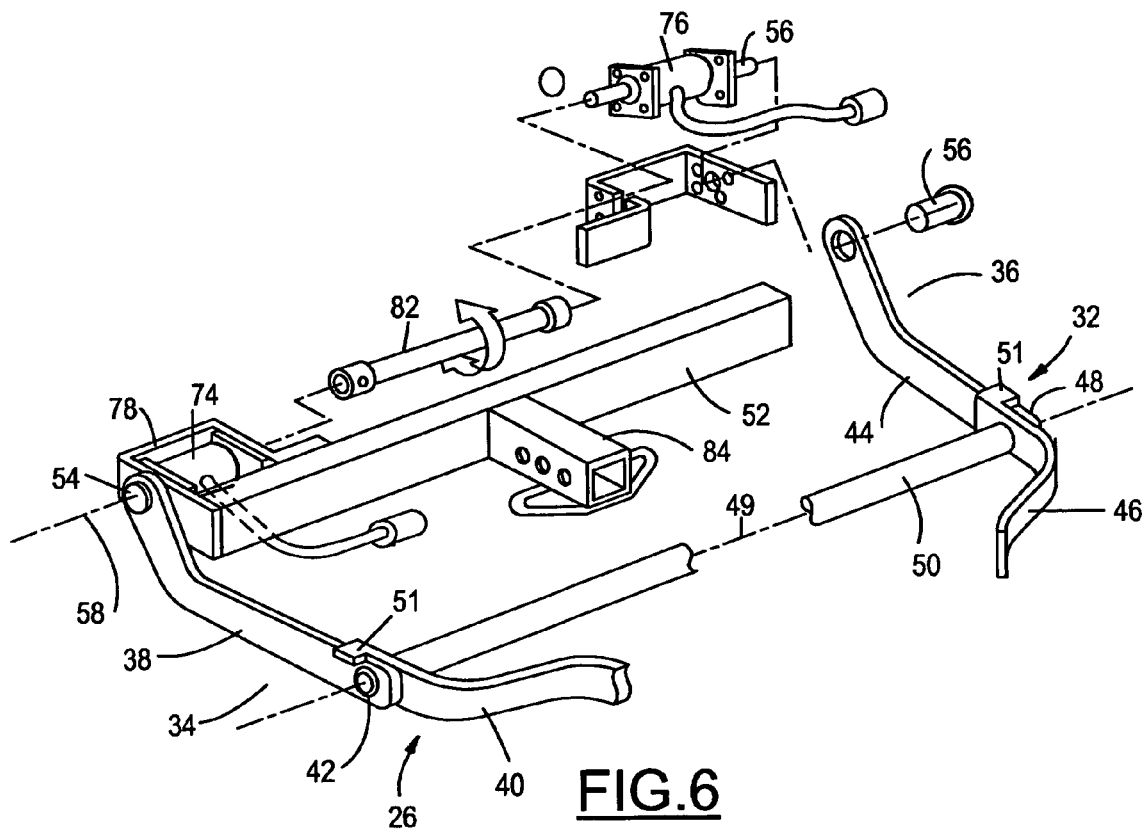
FIG. 6 is a fragmentary perspective view showing a power drive for the carrier.

FIG. 6 shows a power drive for the carrier 32 comprising a pair of direct-drive high-torque electric assist motors 74 and 76 which have output shafts which actually serve as the pivot pins 54 and 56 to swing the carrier toward and away from its upright position. The two motors are secured by brackets 78 and 80 to the ends of the frame bar 52 and are interconnected by a connecting rod 82 so that they operate in synchronism.

A trailer hitch 84 is connected to the same rigid vehicle frame 52 midway between the arms 34 and 36.

In use, and when it is desired to open the tail gate 12 for loading and unloading the cargo area 16 of the vehicle, the latch pin 70 is released from the latch bracket 74 and the carrier 32, with the tire and wheel assembly 28 mounted thereon, is swung to the lower position shown in FIG. 3. Then preferably the outer arm segments of the two arms 34 and 36 are doubled back to the folded condition shown in FIG. 4, after which the tail gate can be swung to the open position of FIG. 5. The folded carrier is now directly beneath the open tail gate so that it does not interfere with loading and unloading. After the tail gate is closed, the carrier arms are unfolded and the carrier is returned to the position of FIGS. 1 and 2. The latch pin 70 is re-engaged with the latch bracket 74 on the tail gate to secure the carrier in the stowed position.

When it is desired to remove the tire and wheel assembly 28, the carrier 32 will be released from the tail gate 12 and swung to the position of FIG. 3 where the tire and wheel assembly 28 are in a position in which it may be easily detached from the carrier. The carrier without the wheel and tire assembly attached can then be returned to the position of FIG. 1.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. Apparatus for stowing a spare tire and wheel assembly on a rear tail gate of a motor vehicle, comprising:
   a carrier having an inner end pivoted to a rigid vehicle frame structure beneath the rear tail gate for vertical swinging movement of the carrier relative to a transverse horizontal axis from a generally upright stowage position downwardly to a rearwardly extending, lower position, the carrier comprising an arm having an inner arm segment pivoted to the rigid vehicle frame structure by a first pivot and an outer arm segment pivoted to the inner arm segment by a second pivot,
   a latch mechanism that releasably latches the carrier to the tail gate when in the stowage position,
   a mount on a swinging end of the carrier for releasably mounting the spare tire and wheel assembly, the mount pivotally attached to the carrier,
   wherein the rearwardly extending, lower position comprises a second position that is a spare tire and wheel assembly removal position enabling removal of the wheel assembly from the mount and a third position that is a stowed position where the mount underlies the vehicle, wherein the inner and outer arm segments are pivoted in a first direction about the first pivot from the generally upright stowage position toward the spare tire and wheel assembly removal position and the outer arm segment is pivoted in a second direction about the second pivot relative to the inner arm segment from the spare tire and wheel assembly removal position toward the stowed position, wherein the second direction is the same as the first direction.

2. The apparatus of claim 1 wherein the mount underlies the vehicle when the carrier is disposed in the third position.

3. The apparatus of claim 1 wherein the rear tail gate is vertically rotatable relative to the transverse horizontal axis between a generally upright closed position and a substantially horizontal open position and wherein, when the carrier is disposed in the third position, the spare tire and wheel assembly and carrier are disposed directly underneath of the rear tail gate when the rear tail gate is disposed in the substantially horizontal open position enabling unobstructed access to a cargo area of the vehicle.

4. The apparatus of claim 1, wherein the carrier comprises laterally spaced apart first and second arms, each of said arms comprises an inner arm segment and an outer arm segment, the carrier is pivoted to the rigid vehicle frame structure by aligned first pivot pins pivotally supporting inner ends of the respective inner arm segments about a first generally transverse horizontal axis, the outer arm segments have outer ends to which the mount is pivotally attached, and the inner and outer arm segments of each of said arms are pivoted to one another by aligned second pivot pins pivotally supporting the inner ends of the respective outer arm segments about a second generally transverse horizontal axis.

5. The apparatus of claim 4, further including a power drive operatively coupled to one of the inner arm segments enabling said carrier to be swung between said stowage position and said lower position by causing the inner arm segments to pivot about a corresponding one of the first pivot pins about said transverse horizontal axis.

6. The apparatus of claim 4, wherein the tail gate has a lower portion hinged to the vehicle on a third generally transverse horizontal axis for downward swinging of the tail gate about the third generally transverse axis from a generally upright closed position to the substantially horizontal open position for loading and unloading cargo into and out of the vehicle,
   wherein when the carrier is disposed in the third position, the spare tire and wheel assembly and carrier are disposed underneath the rear tail gate, and the rear tail gate is disposed in the substantially horizontal open position providing unobstructed cargo area access, and wherein the outer arm segments are doubled back on the inner arm segments about the second pivot pins to a folded condition in which said inner and outer arm segments are substantially parallel to one another so that when the carrier is in the third position with the inner and outer arm segments in the folded condition, the carrier can be overlain by the rear tail gate when the tail gate is in the open position.

7. The apparatus of claim 6, further including a power drive operatively coupled to at least one of said arms enabling carrier to be swung between the stowage position and the lower position.

8. The apparatus of claim 7, further including a trailer hitch mounted on the rigid frame structure between the first pivot pins.

9. The apparatus of claim 7, wherein the rigid vehicle frame structure comprises a generally transversely extending bar, wherein the power drive comprises an electric motor mounted to the bar, and wherein the electric motor rotates one of the inner and outer arm segments about a corresponding generally horizontal pivot pin axis thereof when swinging the carrier between the stowage position and the lower position.

* * * * *